June 10, 1941.     G. W. WATSON     2,245,238
COFFEE MAKING DEVICE
Filed May 1, 1939
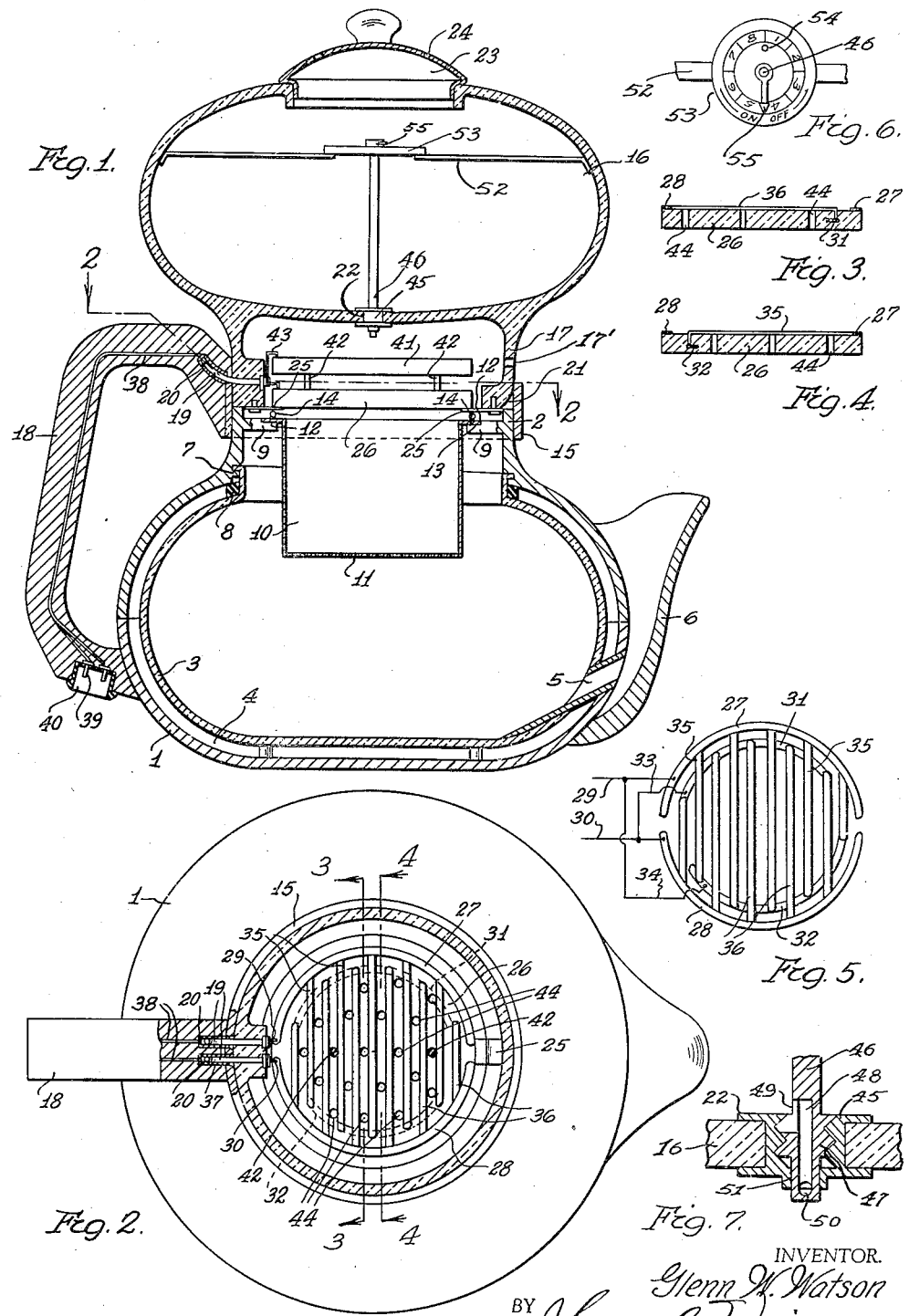
INVENTOR.
Glenn W. Watson
BY Samuel Weisman
ATTORNEY.

Patented June 10, 1941

2,245,238

UNITED STATES PATENT OFFICE 2,245,238

COFFEE MAKING DEVICE

Glenn W. Watson, Detroit, Mich.

Application May 1, 1939, Serial No. 271,075

2 Claims. (Cl. 219—44)

The present invention pertains to a novel apparatus for and a method of making coffee. The method is essentially an electrical one whereby cold water is heated electrically within the apparatus and partially converted into steam.

One of the objects of the invention is to provide a method whereby the ground coffee is subject to the action of steam as well as to hot water. Further, the steam generated within the apparatus plays on the ground coffee, the surface of the coffee solution, and the inner walls of the part of the apparatus containing the solution. This part of the apparatus, therefore, requires no separate heating means to keep the solution hot.

By comparative tests with the conventional methods, using equal amounts of the same kind of coffee and equal quantities of water throughout, it has been shown that coffee prepared according to the method herein described is stronger and richer, has a unique reddish amber color, and about half the acidity, which is the cause of bitterness in coffee.

Another object of the invention is to provide an electrical apparatus requiring no manual switch. The closing of the circuit depends on the wetting of the electric element within the apparatus. When water is allowed to drip on this element, the circuit is closed through the water, and the latter is heated and partially converted into steam by the flow of current therethrough. When the water ceases to flow, the circuit is broken as soon as the electrical element becomes dry. Thus, there can be no overheating, overboiling or any other damage due to failure to open a switch or pull out the plug at the proper time.

The invention is fully disclosed by way of example in the following description and in the accompanying drawing in which—

Figure 1 is a vertical section of the device;

Figure 2 is a section on the line 2—2 of Figure 1;

Figure 3 is a section on the line 3—3 of Figure 2;

Figure 4 is a section on the line 4—4 of Figure 2;

Figure 5 is a plan view of one of the electrical elements, without the ceramic body and showing the wiring in diagram;

Figure 6 is a detail plan view of the valve index, and

Figure 7 is a vertical section of the valve.

Reference to these views will now be made by use of like characters which are employed to designate corresponding parts throughout.

In Figure 1 the device is shown as including a bowl 1 of hardened plastic or other suitable material and formed at its top with a neck 2. The bowl is preferably fitted with an inner wall 3 spaced from the outer wall, and the space 4 being evacuated for heat insulation. Near the bottom, both walls are formed with a walled passage 5 communicating with a suitable pouring spout 6 attached to the outer surface of the bowl 1. The upper open end of the inner receptacle 3 is preferably attached to the bowl 1 by a single thread 7, as illustrated in Figure 1, with a spacing gasket 8 preferably interposed.

On the inner surface of the neck 2 are formed a suitable number of spaced lugs 9 from which is suspended a flanged container 10 for dry coffee and having a perforated bottom 11. The lugs 9 are preferably notched at 12 to locate and seat the flange 13. The latter is formed with knobs 14 for lifting as will presently be described.

Around the neck 2 is fixed an upwardly projecting collar 15. Upon the neck is mounted a water receptacle 16 having a cylindrical hollow base 17 that seats in the collar 15 and is vented at 17'. A handle 18 has one end fixed to the collar 15 and the other end to the receptacle 1, near the bottom thereof, as shown in Figure 1. The base 17 carries a pair of outwardly and upwardly extending prongs 19 that enter similarly shaped cavities 20 in the upper end of the handle 18, as may be seen by a comparison of Figures 1 and 2. By this means, the receptacle 16 is secured and retained in proper position, and the electric circuit is thereby made, as will presently be described. The lower edge of the base 17 is rounded at 21 opposite the prongs 19 to permit the rocking movement necessary to insert or remove the prongs.

The water receptacle 16 has a single aperture 22 in its bottom to permit water to drip therefrom, or more apertures may be provided if desired or necessary. The top of the receptacle 16 has a cap 23 which is lifted when water is to be poured in. The cap has one or more apertures 24 to permit dripping through the aperture 22.

The base 17 carries a supporting means, such as a plurality of lugs 25 extending inwardly therefrom, to support an electrical element including a body 26 of ceramic or other insulating material. On the upper surface of the body and near its edges are mounted two conductors 27 and 28 spaced apart at their ends, as shown in Figures 2 and 5. These conductors are connected respectively to opposite sides 29 and 30 of an electric circuit, as illustrated in Figure 5. Inward of the conductors 27 and 28 and spaced only slightly therefrom are similar conductors 31 and 32 respectively but embedded in the body 26, as shown in Figures 3 and 4. The conductors 31 and 32 are connected at 33 and 34 to the lines 30 and 29 respectively and are therefore of opposite sign to their respective adjacent contacts 27 and 28. Conductors 27 and 32 are connected across the surface of the body 26 by bars or conductors 35 in parallel relation. Conductors 31 and 28 are similarly interconnected by alternating bars or conductors 36. Thus, both ends of each bar 35 are connected to one side of the circuit, and both ends of each bar 26 to the other side, but there is no flow of current until at least one bar 35 is electrically connected to a bar 36.

The lines 29 and 30 are fastened respectively to the prongs 19, as shown in Figure 2. The cavities 20 are lined with conductive material 37, and the linings are joined by wires 38, running through the handle 18, to fingers 39 positioned in a cavity 40 formed in the lower end of the handle. The cavity 40 is adapted to receive a plug at the end of an electric cord, and there is no danger of shock because of the concealed fingers 39. A similarly constructed electric element 41 may be mounted in spaced relation above the element 26 and supported thereon by insulating legs 42. The element 41 is wired to the lines 29, 30 and the prongs 19 in the manner previously described and as designated generally by the numeral 43 in Figure 1.

In the use of the device, the receptacle 16 is lifted out of the collar to permit filling the receptacle 16 with dry coffee. It will be seen that the elements 26 and 41 are removed with the receptacle 16 and are disconnected completely from the circuit by removal of the prongs 19 from the cavities 20. The receptacle 16 may be then lifted out by the lugs 14 and the proper quantity of ground coffee placed therein, after which it is returned to its former position. The base 17 of the receptacle 16 is then inserted in the neck 15, while the prongs 19 are inserted in their cavities, as already described.

Water is then poured into the receptacle 16 on lifting the cap 23. The water drips through the aperture 22 upon the upper element, where the electric circuit is closed when the water joins a member 35 to a member 36.

The rate of dripping is such, as compared with the size and spacing of the exposed conducting bars, that the water boils and some of it is converted into steam. The water flows or is forced by the steam onto the lower element 26 where it undergoes similar treatment and finally overflows into the ground coffee receptacle 16. The coffee solution is made here and drips through the bottom 11 to the inner receptacle 3.

The heating units may be characterized as being flush or water-shedding, that is, they do not have a pool-forming rim, and consequently only a film of water can be deposited thereon. The practical results of this construction are three-fold. (1) It is not necessary to heat a body of water in order to obtain boiling water or steam. (2) The film method of applying the water on the heating units produces a larger quantity of steam from a given quantity of water than do the methods wherein the current must flow through a substantial body of water. The effect of a higher proportion of steam as herein produced is shown in the comparative tests described below. (3) In heating a film of water, there is no liberation of hydrogen, oxygen or ozone, as in the case of passing a current through a body of water, especially at high current density. This consideration is important in view of the sensitiveness of coffee to these elements.

The steam that is generated impinges on the coffee grounds as well as against the inner receptacle 3 and the surface of the strained coffee solution. The steam is well confined to this region by the base 17 and the bottom of the water receptacle.

This is live or dry steam, since it is invisible through a transparent single walled receptacle, which however becomes quite hot. In the described construction, loss of heat through the receptacle 1 is avoided by the vacuum space 4 as described. The boiling water flows to the coffee grounds through apertures 44 in the elements 26, 41, while the steam also flows through the apertures and around the edges of the elements.

The combination of hot water and a high ratio of steam acting on the coffee grounds produces a different solution than hot water alone according to the conventional methods. Comparative tests with equal amounts of the same kind of coffee and equal quantities of water produce a stronger and richer solution by the method herein described, with about half the usual acidity and a characteristic reddish amber color. Another effect of the generation and retention of the steam is that the coffee solution is kept hot without auxiliary heating means, and this result is enhanced by the vacuum insulating space 4.

When the water receptacle 16 has emptied itself, the electric circuit requires no further attention, since it opens as soon as the electrical elements become dry. Thus, there is no danger of boiling away the water or burning out the elements under any circumstances. In lifting out the elements with the vessel 16 in the manner described, there is no danger of electric shock, since the elements have been entirely severed from the circuit at the cavities 20.

It will be seen that each bar 35 and 36 has both ends connected to inside of the circuit. This arrangement provides a better distribution of current and more rapid and uniform heating of the water than if the bars were connected into the circuit at only one end.

In the aperture 22 of the vessel 16 may be fitted a valve consisting of a ferrule 45 into which is screwed one end of a stem 46 having its lower end formed with a coarse thread 47. In this end is an axial hole 48 having its upper end opening at 49 into the vessel 16. A transverse port 50 across the bottom of the hole 48 places the hole in communication with the space below the bottom of the vessel 16, when the stem is screwed down. When screwed up, the port closes against the smooth wall 51 of the ferrule 45.

The stem 46 extends well upward into the vessel where a number of spider arms 52 extend from the inner wall of the vessel a ring 53 in which the upper end of the stem is journaled. On the disk is a stop pin 54 denoting the beginning and end of a series of graduations on the disk. The upper end of the stem 46 carries a pointer 55 cooperating with the graduations.

The pointer is so related to the graduations and the screw 47 that the hole is closed when the pointer is on the zero side of the pin 54 and fully opened when the pointer is on the other side. Various degrees of opening are obtained by setting the pointer to intermediate positions.

With a given amount of coffee grounds and water, various strengths of coffee are obtained by regulating the valve. The smaller the opening at the port 50, the stronger is the brew of coffee. This is accounted for, at least in part, by the fact that a slower drip of water enables the formation of a proportionately larger quantity of steam, and the strength of the brew appears to be dependent on the ratio of steam and water. In any event, it is evident that the strength of the brew may be varied without changing the quantity of coffee grounds or water.

The water valve may be used for still another purpose. With the valve closed, the proper quantity of water can be poured into the vessel 16 at night for breakfast coffee, or well in advance of the time when the coffee is to be served, the device being plugged into the circuit at the prongs 39. When the coffee is wanted, in the morning or at some other time, it is only necessary to turn the pointer 55 to the graduation corresponding to the kind of coffee desired. The circuit is automatically closed by the water, in the manner already described. Hot coffee is prepared at the rate of 45 seconds to two minutes per cup, according to the degree of opening of the port 50.

The electrical elements may be detachable from the vessel to permit washing the latter separately. The coffee receptacle 10 is filled while resting on the lugs 9, with the vessel 16 and electrical elements removed.

Although a specific embodiment of the invention has been illustrated and described, it will be understood that various alterations in the details of construction may be made without departing from the scope of the invention, as indicated by the appended claims.

What I claim is:

1. A coffee making device comprising a receptacle for coffee solution, a perforated receptacle for ground coffee suspended therein, a water vessel mounted on the first receptacle and above the second receptacle, and an electric element for heating water and generating steam carried by said vessel below its bottom, said element being adapted to close its circuit through a water film thereon, said bottom being perforated over said element, a handle carried by the first receptacle and having conductive sockets comprised in an electric circuit, and contact fingers carried by said element and adapted for insertion in said sockets, to connect said element into the circuit and to retain said vessel in operative position on the first receptacle.

2. A coffee making device comprising a receptacle for coffee solution, a perforated receptacle for ground coffee suspended therein, a water vessel mounted on the first receptacle and above the second receptacle, and an electric element for heating water and generating steam carried by said vessel below its bottom, said element being adapted to close its circuit through a water film thereon, said bottom being perforated over said element, a handle carried by the first receptacle and having conductive sockets comprised in an electric circuit, and contact fingers carried by said element and adapted for insertion in said sockets, to connect said element into the circuit and to retain said vessel in operative position on the first receptacle, conductors extending from said sockets to the lower end of said handle and terminating in a cavity in said lower end, said cavity being adapted to receive an electric plug.

GLENN W. WATSON.